United States Patent

Strutzel et al.

[11] 4,034,055
[45] July 5, 1977

[54] TUBULAR FILM OF POLYETHYLENE TEREPHTHALATE AND PROCESS FOR THE PRODUCTION THEREOF

[75] Inventors: Hans Strutzel, Wiesbaden; Detlef Gneuss, Marktredwitz; Ludwig Klenk, Hallgarten, all of Germany

[73] Assignee: Hoechst Aktiengesellschaft, Germany

[22] Filed: Mar. 18, 1975

[21] Appl. No.: 559,405

Related U.S. Application Data

[62] Division of Ser. No. 501,628, Aug. 29, 1974.

[30] Foreign Application Priority Data

Aug. 30, 1973  Germany .......................... 2343698

[52] U.S. Cl. .............................. 264/95; 264/209; 264/210 R; 264/288; 264/290 T; 425/326 R
[51] Int. Cl.² ..................... B29D 7/24; B29C 17/02
[58] Field of Search ................. 264/95, 210 R, 288, 264/289, 209, 290 R, 290 T; 425/326 R

[56] References Cited

UNITED STATES PATENTS

| | | | |
|---|---|---|---|
| 2,578,899 | 12/1951 | Pace | 264/95 |
| 3,551,540 | 12/1970 | Pellicciari et al. | 264/210 R |
| 3,659,000 | 4/1972 | Cronk | 264/210 R |
| 3,725,519 | 4/1973 | Seifried et al. | 264/95 |

FOREIGN PATENTS OR APPLICATIONS 811,066   3/1959   United Kingdom ................. 264/95

Primary Examiner—Jeffery R. Thurlow
Attorney, Agent, or Firm—James E. Bryan

[57] ABSTRACT

This invention relates to a biaxially stretched and longitudinally afterstretched thin-walled tubular film of polyethylene terephthalate having a tensile stress of 40 to 60 kg/mm² and a tear resistance of 40 to 70 kg/mm² in the longitudinal direction, and an elongation at break of 350 to 800% in the transverse direction. The invention also relates to a process for the production of the film.

5 Claims, 1 Drawing Figure

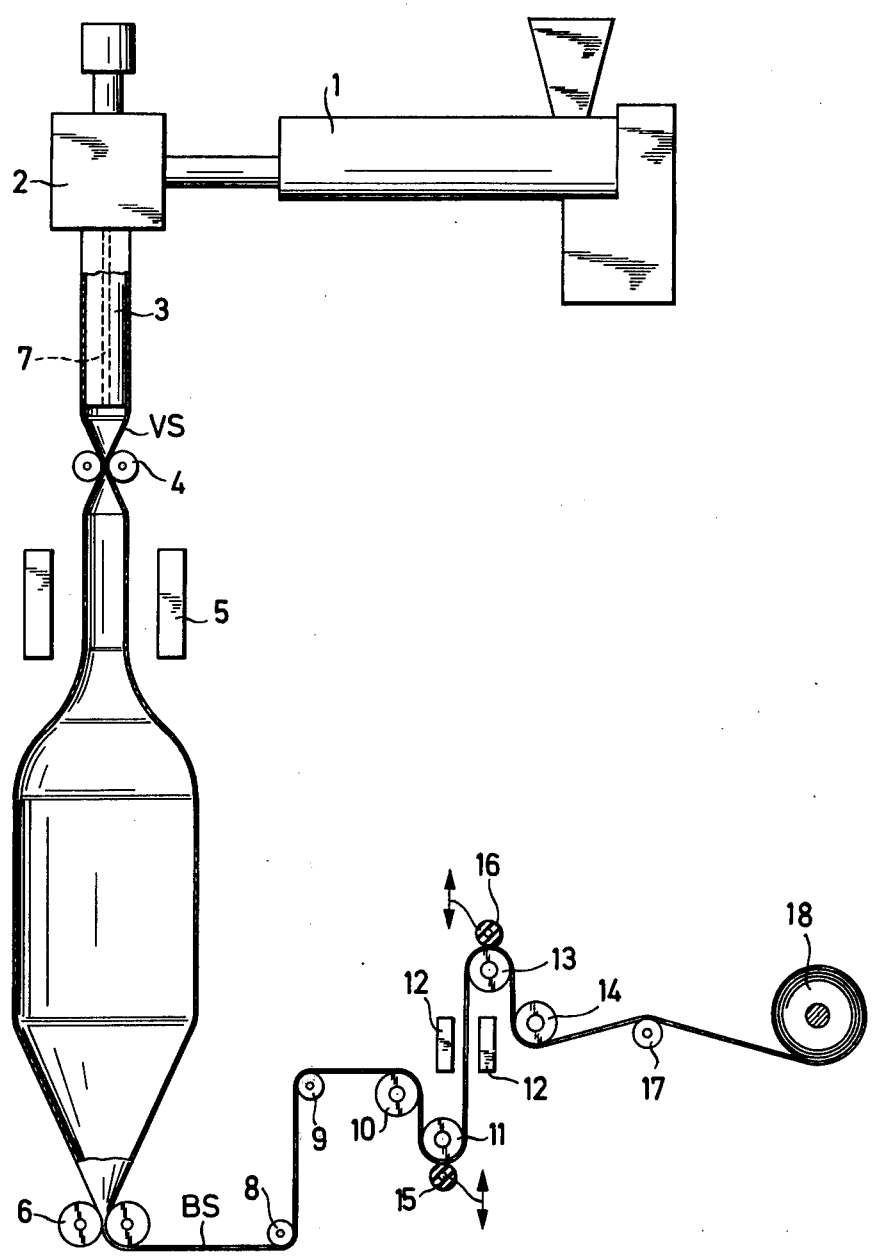

TUBULAR FILM OF POLYETHYLENE TEREPHTHALATE AND PROCESS FOR THE PRODUCTION THEREOF

This is a division, of application Ser. No. 501,628, filed Aug. 29, 1974.

This invention relates to a biaxially stretched and longitudinally afterstretched tubular film of polyethylene terephthalate which is distinguished from prior art films by improved physical properties. The invention further relates to a process for the production of the tubular film.

Tubular films of polyethylene terephthalate are produced according to known processes as described, for example, in British Pat. Nos. 787,479; 811,066, and 843,113, in such a manner that the amorphous tubular film obtained by the extrusion of polyethylene terephthalate is subjected to biaxial stretching at temperatures above the second order transition point of the polyethylene terephthalate. According to the disclosure of British Pat. No. 811,066, certain physical properties, particularly the tensile strength, of the biaxially stretched tubular film can be further improved when biaxial stretching is followed by another longitudinal stretching at temperatures between the second order transition point and the melting temperature range.

According to those known processes for the production of tubular films of polyethylene terephthalate, biaxial stretching generally is carried out simultaneously, longitudinal stretching occurring between two pairs of rollers with speeds which are different by the desired longitudinal stretching factor and circumferential stretching occurring by simultaneously inflating the tubular film by means of gas. According to the known processes for longitudinal stretching following biaxial stretching, the tubular film must be inflated again to counteract neck-in and the formation of longitudinal creases during longitudinal stretching and to prevent the two tube walls from sticking together when they contact each other. Whereas inflation of the tubular film for biaxial stretching can be performed relatively easily according to known methods, the introduction of a gas cushion during longitudinal stretching following biaxial stretching is much more difficult. According to a generally known method, inflation of the tube can be performed by introducing a gas by means of an injection needle. But for this purpose, the tube must be pierced for which reason other methods which do not damage the tube have been sought.

According to a method mentioned in the known British Patents, the gas is introduced by means of a hollow needle which is passed from the extruder head through the pairs of rollers; for this purpose, however, at least one roller of the pair of rollers must have an indentation around its circumference corresponding to the cross-section of the hollow needle. Apart from the fact that the rollers must be provided with accurately machined grooves and additionally, for achieving a satisfactory seal, must be lined with elastic materials, this process of introducing gas can be used only when the total tube production process proceeds in a straight line.

For longitudinal stretching following biaxial stretching, according to another method, the gas for inflating the tube is introduced by means of special pairs of squeeze rollers. Working in only one line is avoided thereby but the technical equipment, particularly for the special manufacture of the pairs of squeeze rollers, is very expensive and maintaining a certain air pressure in the tube during longitudinal stretching can be achieved only with difficulty due to the always occurring pressure fluctuations.

By the above processes, particularly by the process of British Pat. No. 811,066 which is most similar to the invention, tubular films can be obtained which have relatively thin walls but the tensile stress and the tear resistance in the longitudinal direction as well as the elongation at break in the transverse direction are not optimally coordinated to one another. In particular, thin-walled stretched tubular films are desirable which have a small diameter and which have higher values than have the hitherto known tubular films, particularly as regards the tear resistance in the longitudinal direction, the tensile stress, and the elongation at break in the transverse direction and, furthermore, preferably do not shrink in the transverse direction or do so only to an extremely limited extent also upon temperature stress.

Thus, a need has existed for developing a film of the above kind.

The present invention provides a biaxially stretched and longitudinally afterstretched thin-walled tubular film of polyethylene terephthalate, having a tensile stress of 40 to 60 kg/mm$^2$ and a tear resistance of 40 to 70 kg/mm$^2$ in the longitudinal direction, and an elongation at break of 350 to 800% in the transverse direction. The tensile stress, the tear resistance, and the elongation at break were determined according to DIN 53455 (German Industrial Standard). Preferably, the film has a wall thickness of 15 to 50 $\mu$m and a diameter of 12 to 150 mm. Shrinkage in the transverse direction, measured at 90° C, of a further preferred type of the film is in the range of <5%, particularly of <2%.

The film of the invention is particularly suitable for filling with pasty goods, such as with cements, colors or the like, as it is stressed by filling particularly as regards the tear resistance in the longitudinal direction and elongation in the transverse direction.

The present invention also relates to a process for the production of a tubular film of polyethylene terephthalate in which longitudinal stretching following biaxial stretching for improving the physical properties of the tubular film can be carried out without inflation of the tubular film.

This is achieved by biaxial stretching in the range of the second order transition point of an extruded amorphous tubular film of polyethylene terephthalate and subsequent longitudinal stretching at temperatures between the second order transition point and the melting temperature range. Biaxial stretching is carried out at a stretching ratio of 3.3 to 4.2 in the longitudinal direction and 4.0 to 4.7 in the transverse direction at temperatures from 84° to 86° C., and further longitudinal stretching is carried out without the introduction of a gas cushion at a stretching ratio of 1.05 to 2.5 at temperatures from 148° to 152° C.

It was surprising that, under the conditions of temperatures and stretching ratios employed in accordance with the invention, longitudinal stretching following biaxial stretching of an extruded polyethylene terephthalate tube could be performed without inflating the tube, whereas the introduction of a gas cushion during longitudinal stretching according to the known processes is considered absolutely necessary for preventing creasing.

Suitable polyethylene terephthalates are those produced by polycondensation of terephthalic acid with aliphatic diols according to conventional processes. The second order transition point of such polyethylene terephthalates is in the range of about 70° to 80° C.

The process of the invention is performed in such a manner that the amorphous tubular film obtained according to known methods by extrusion — e.g. by extruding the polyethylene terephthalate melt over a cooled, cylindrical calibrating mandrel and drawing-off the amorphous tubular film by means of a pair of rollers — is first subjected to biaxial stretching at a longitudinal stretching ratio of 3.3 to 4.2, preferably of 3.3 to 3.7, and a circumferential stretching ratio of 4.0 to 4.7, preferably to 4.2 to 4.5, and at a temperature of the tubular film of 84° to 86° C. The biaxially stretched tubular film is further longitudinally stretched without the introduction of a gas cushion at a longitudinal stretching ratio of 1.05 to 2.5, preferably of 1.1 to 2.0, the temperature of the tubular film being 148° to 152° C, preferably 150° C.

It is advantageous for achieving the improved physical properties of the film to exactly follow the stretching ratios and temperatures of the process given for biaxial stretching and subsequent longitudinal stretching.

Biaxial stretching is advantageously carried out, according to known methods, simultaneously between two pairs of rollers. The longitudinal stretching force is effected by a second pair of rollers arranged in the direction of extrusion, which, of achieving the necessary longitudinal stretching ratio, run at a correspondingly higher speed than the first pair of rollers closer to the extruder. The transverse stretching force is effected by a gas pressure, e.g. air pressure, which is applied to the tube by introducing a gas. The introduction of the gas into the interior of the tube may be, for example, from the extruder head through a feed line in the calibrating mandrel, the width of the first pair of rollers being smaller than the width of the flattened tubular film.

The longitudinal and transverse stretching ratios to be maintained in accordance with the invention can be easily adjusted by using a corresponding internal pressure and a corresponding speed relation between the first and second pairs of rollers. Biaxial stretching also may be performed consecutively. In this case, however, it is necessary for the success of the process of the invention that first longitudinal stretching and then transverse stretching be performed.

Longitudinal stretching following biaxial stretching is also performed according to known methods, e.g. between the mentioned second pair of rollers and a third pair of rollers which run at a higher speed corresponding to the required stretching ratio. Simultaneous inflation of the tube during this longitudinal stretching for preventing creasing or sticking of the tube walls to each other is not necessary in accordance with the invention. The tube runs without creasing, completely planar through the longitudinal stretching zone and the mutual contact of the inside walls of the tube does not result in sticking.

During biaxial stretching as well as during subsequent longitudinal stretching, the tube runs through a heating zone in which it is heated to the required temperatures. Heating may be performed, for example, by means of hot air passed in a suitable device to the tubular film or by means of infrared radiators. Exact control of the film temperatures is possible by means of a radiation pyrometer, for example.

The process of the invention may be performed continuously or intermittently. A tube biaxially stretched according to the conditions of the invention may be subjected to longitudinal stretching in a second process step not necessarily immediately following biaxial stretching.

The process, furthermore, may be performed at a right angle or another angle to the extruder.

An exemplary arrangement for the performance of the process of the invention is illustrated in the accompanying drawing in a diagrammatic cross-sectional view, without the invention being limited to the embodiment shown.

The polyethylene terephthalate melt extruded from the extruder 1 through the annular die 2 is calibrated on an internal cooling mandrel 3 to form an amphorous tubular film (preliminary tube) VS, which is flattened by the pair of rollers 4 and drawn-off thereby at a speed $V_1$. The amorphous tube passes through the heating zone 5 in which it is heated to the biaxial stretching temperature. The longitudinal component of the stretching force is provided by the pair of squeeze rollers 6 which impart to the tube the speed $V_2$, which corresponds to the desired longitudinal stretching ratio; $V_2$ thus is correspondingly higher than $V_1$. Transverse stretching is effected by means of gas pressure introduced via the feed line 7 into the interior of the tube. The biaxially stretched tubular film BS, flattened by the pair of rollers 6 and drawn-off at the speed $V_2$, first runs over the two guide rollers 8 and 9 and then over the heated rollers 10 and 11, the speed $V_3$ of which is so adjusted that the film remains tightened between the parts 6 and 10.

By means of the heated rollers 10 and 11, in particular by means of the heating device 12, the tubular film is heated to the longitudinal stretching temperature. Longitudinal stretching is performed by means of the pair of rollers 13 and 14 which are cooled and run at the speed $V_4$, $V_4$ being correspondingly higher than $V_3$. The two rubber rollers 15 and 16 ensure that the tube closely contacts the rollers between which longitudinal stretching is performed. As for biaxial stretching, heating of the tube to the required temperature is effected by an infrared radiator; the tube temperature is controlled by means of a radiation pyrometer.

After longitudinal stretching, the tube passes over the guide roller 17 and is wound onto the roll 18.

The process of the invention for the production of the tubular film from polyethylene terephthalate therefore is very efficient because it can be performed in a simple manner and with less apparatus than the known processes. Whereas, according to the known processes, longitudinal stretching for partially improving the physical properties of a biaxially stretched tube of polyethylene terephthalate can be performed only with technically complicated inflation of the tube, inflation is not necessary in the present process. Furthermore, the tubes have physical properties the interesting physical characteristics of which are superior to those achievable according to known processes. The resulting values, which are superior to those of the prior art, can be seen from the table below.

In the following examples the production of tubular films of polyethylene terephthalate according to the invention is described and the measured physical properties of the tubes are compared with the values of tubular films of polyethylene terephthalate obtained according to the most similar process of British Pat. No. 811,066.

EXAMPLE 1

Polyethylene terephthalate with a second order transition temperature of 76° C, a crystallization temperature of 132° C, a melting point of 260° C (calculated on a heating speed of 2° C/min.), and a viscosity of 1,800 poises at 275° C was fed as a granulate to an extruder which melted the product at 270° C. After extrusion from an annular die mounted downstream, the melt was hardened on a calibrating mandrel (diameter 14.5 mm) connected with the die and cooled with water to form an amorphous tube of a diameter of 14.5 mm. The output speed was 10 m per minute. The amorphous tube hardened on the cooling mandrel was drawn-off by a first pair of rollers at a speed of 10 m per minute and flattened. The flattened tube, further conveyed by a second pair of rollers, was heated to 85° C between the two pairs of rollers by means of infrared radiation and then biaxially stretched. Stretching in the longitudinal direction was performed at a ratio of 3.6, since the second pair of rollers further conveyed the tube at a speed of 36 m per minute, and transverse stretching was performed at a ratio of 4.5, since the tube was expanded to a diameter of 65 mm by means of an internal gas pressure of 0.2 bar introduced via the calibrating mandrel. The thus biaxially stretched tube flattened by the second pair of rollers, after passing the guide rollers, was conveyed over a third pair of rollers running at a slightly higher speed than the second pair of rollers, for maintaining the tension, and over a fourth pair of rollers, longitudinal stretching being performed between the third and fourth pairs of rollers. For this purpose, the tube was heated at 150° C between the third and fourth pairs of rollers and longitudinally stretched at a ratio of 1.28, since the fourth pair of rollers drew-off the tube at a speed of 46 m per minute. After the latter stretching, the cooled tube was wound onto a roll.

EXAMPLE 2

The process was repeated analogously to the procedure of Example 1 but at a longitudinal stretching ratio 1.83 for longitudinal stretching following biaxial stretching. The internal gas pressure for biaxial stretching was 0.3 bar.

EXAMPLE 3

The process was repeated analogously to the procedure of Example 1 with the use of a calibrating mandrel of a diameter of 22 mm, but at a longitudinal stretching ratio of 1.56 for longitudinal stretching following biaxial stretching. The internal gas pressure for biaxial stretching was 0.2 bar.

EXAMPLE 4

The process was repeated analogously to the procedure of Example 1 with the use of a calibrating mandrel of a diameter of 9.5 mm, but at a transverse stretching ratio of 4.25 for biaxial stretching and a longitudinal stretching ratio of 1.96 for longitudinal stretching following biaxial stretching. The internal gas pressure for biaxial stretching was 0.55 bar.

EXAMPLE 5

The process was repeated analogously to the procedure of Example 1 but with the use of a polyethylene terephthalate of a viscosity of 4,000 poises at 275° C and a calibrating mandrel of a diameter of 42 mm, but at a transverse stretching ratio of 4.3 for biaxial stretching and a longitudinal stretching ratio of 1.35 for subsequent longitudinal stretching. The internal gas pressure for biaxial stretching was 0.1 bar.

In all cases, shrinkage of the films produced according to the foregoing examples was below 2% in the transverse direction, measured at 90° C, 15 sec. in water.

In the Table below, the physical properties of the tubes produced in Examples 1 to 5 are shown and compared with the values achieved according to the prior art.

As can be seen from the Table, the tensile stress and the tear resistance in the longitudinal direction as well as the elongation in the transverse direction are markedly increased compared to comparable films produced according to the prior art, whereas the other given values have not been changed substantially.

TABLE I

| | Characteristic physical data of the tubular films, measured according to DIN 53455 | | | | | | |
|---|---|---|---|---|---|---|---|
| | Thickness of the tubular film, $\mu m$ | Longitudinal direction | | Elongation at break, % | Transverse direction | | Elongation at break, % |
| Examples | | Tensile stress, $kg/mm^2$ | Tear resistance, $kg/mm^2$ | | Tensile stress, $kg/mm^2$ | Tear resistance, $kg/mm^2$ | |
| 1 | 17 | 43 | 50 | 30 | 8 | 11 | 340 |
| 2 | 27 | 50 | 55 | 11 | 6.5 | 8.3 | 450 |
| 3 | 27 | 36 | 40 | 17 | 7 | 6.7 | 610 |
| 4 | 46 | 55 | 62 | 8 | 5.5 | 6.2 | 720 |
| 5 | 29 | 44 | 52 | 33 | 8.1 | 9 | 380 |
| Comparison with tubular films according to British Pat. No. 811,066 (Table, Examples) | | | | | | | |
| 3 | 20 | 36.4 | 38.5 | 12 | 5.6 | — | 300 |
| 4 | 22.5 | 25.9 | 35.7 | 35 | 8.4 | 15.4 | 205 |

It will be obvious to those skilled in the art that many modifications may be made within the scope of the present invention without departing from the spirit thereof, and the invention includes all such modifications.

What is claimed is:

1. In the process for the production of tubular films of polyethylene terephthalate by biaxial stretching in the range of the second order transition point of an extruded, amorphous tubular film, subsequent longitudinal stretching at temperatures between the second order transition point and the melting temperature range, and cooling, the improvement comprising performing the biaxial stretching at a stretching ratio of 3.3 to 4.2 in the longitudinal direction and 4.0 to 4.7 in the transverse direction at a tube temperature of 84° to 86° C, collapsing the tube into a lay flat film without a gas cushion, and performing the longitudinal after-stretching at a stretching ratio of 1.05 to 2.5 and at a tube temperature of 148° to 152° C.

2. A process according to claim 1 in which the longitudinal stretching of the biaxial stretching is performed at a ratio between 1: 3.3 to 3.7.

3. A process according to claim 1 in which the circumferential stretching of the biaxial stretching is performed at a ratio between 1 : 4.2 and 4.5.

4. A process according to claim 1 in which the longitudinal after-stretching is performed at a ratio between 1 : 1.1 and 2.0.

5. A process according to claim 1 in which after biaxial stretching, the film is cooled.

* * * * *